United States Patent [19]
Hirai

[11] Patent Number: 5,203,222
[45] Date of Patent: Apr. 20, 1993

[54] MOTION CONVERTING MECHANISM

[75] Inventor: Masanori Hirai, Gifu, Japan

[73] Assignee: Teijin Seiki Co., Ltd., Osaka, Japan

[21] Appl. No.: 733,128

[22] Filed: Jul. 19, 1991

[30] Foreign Application Priority Data

Jul. 31, 1990 [JP] Japan ................... 2-204307

[51] Int. Cl.[5] ............................................. F16H 25/20
[52] U.S. Cl. ................... 74/424.8 B; 74/89.15; 74/665 A
[58] Field of Search ........ 74/89.15, 424.8 R, 424.8 B, 74/424.8 VA, 665 A, 718, 730.1, 732.1, 733.1; 92/2; 475/72, 73, 74, 78, 79

[56] References Cited

U.S. PATENT DOCUMENTS

| | | | |
|---|---|---|---|
| 2,972,907 | 2/1961 | Bullard, III | 475/74 X |
| 3,640,147 | 2/1972 | Fantoni | 74/424.8 R |
| 3,785,613 | 1/1974 | Picard | 92/2 X |
| 4,341,132 | 7/1982 | Burdick | 475/72 |
| 4,353,269 | 10/1982 | Hiersig | 475/72 X |
| 4,494,025 | 1/1985 | Fickler | 74/424.8 B X |
| 4,614,128 | 9/1986 | Fickler | 74/424.8 D |
| 4,657,474 | 4/1987 | Nebelung | 92/2 X |
| 4,939,946 | 7/1990 | Teramachi | 74/89.15 |
| 4,994,002 | 2/1991 | Valotto et al. | 475/72 |
| 5,052,986 | 10/1991 | Jarchow et al. | 475/72 X |
| 5,069,081 | 12/1991 | Morita | 74/424.8 B |
| 5,094,118 | 3/1992 | Morita | 74/89.15 X |

FOREIGN PATENT DOCUMENTS

| | | | |
|---|---|---|---|
| 516769 | 9/1955 | Canada | 74/665 A |
| 0151946 | 8/1985 | European Pat. Off. | 475/72 |
| 2202607 | 9/1988 | United Kingdom | 74/89.15 |

Primary Examiner—Allan D. Herrmann
Attorney, Agent, or Firm—Lane, Aitken & McCann

[57] ABSTRACT

A motion converting mechanism comprising a feed member provided with a screwed portion, a screw nut member engaging with the screwed portion of the feed member, a support member rotatably supporting the feed member and the screw nut member, drive means for imparting a rotational motion to the feed member, the rotational motion of the feed member being converted into a linear motion through the screw nut member, and a speed control unit provided between the drive means and the screw nut member and constructed such that it rotates the screw nut member in the same direction as that of the feed member and in the direction opposite to the rotation of the feed member so that a speed of the linear motion is variably controlled.

11 Claims, 2 Drawing Sheets

MOTION CONVERTING MECHANISM

FIELD OF THE INVENTION

The present invention relates in general to a motion converting mechanism which converts a rotational motion into a linear or longitudinal feed motion with the aid of a screw and a nut, and in particular to such a mechanism which controls its output speed variably.

DESCRIPTION OF THE PRIOR ART

There is a motion converting mechanism, such as a rotation and feed mechanism of the injection nozzle part of an injection-molding machine and of the drill or endmill of a cutting machine, which converts a rotational motion into a linear or longitudinal feed motion with the aid of screw connection using a ball screw or trapezoid screw and also controls its output speed variably.

As a motion converting mechanism of the above kind, there is known a differential type screw mechanism, in which a linear motion at low speeds is obtained by rotating the screw and the nut in the same directions so that there occurs a small difference in rotation between them, and also a linear motion at high speeds is obtained by rotating the screw in one direction and the nut in the reverse direction so that there occurs a large difference in rotation between them. In such a mechanism, there is provided braking means for locking and holding rotating members such as screws and nuts.

However, in the conventional motion converting mechanism such as this, the structure of the driving system or structure of the braking means for locking and holding rotating members will become extremely complicated if the mechanism is constructed so that it can cope with a plurality of output modes such as low speed/high torque, high speed/low torque, and intermediate speed/intermediate torque modes. As a consequence, there was the drawback that the apparatus becomes bulky.

It is therefore an object of the present invention to provide an improved motion converting mechanism which is capable of coping with a large number of output modes, is structurally simpler and is of a small size.

SUMMARY OF THE INVENTION

The foregoing object is accomplished in accordance with the present invention by providing a motion converting mechanism comprising a feed member provided with a screwed portion, a screw nut member engaging with the screwed portion of the feed member, a support member rotatably supporting the feed member and the screw nut member, drive means for imparting a rotational motion to the feed member, the rotational motion of the feed member being converted into a linear motion through the screw nut member, and speed control means provided between the drive means and the screw nut member and constructed such that it rotates the screw nut member in the same direction as that of the feed member and in the direction opposite to the rotation of the feed member so that a speed of the linear motion is variably controlled.

The speed control means comprises a first fluid pump/motor coacting with the drive means, and a second fluid pump/motor coacting with the screw nut member and held in fluid communication with the first fluid pump/motor through fluid paths. The speed control means further comprises a first control valve provided on the fluid paths having a first position in which the first fluid pump/motor and the second fluid pump/motor are connected with each other and a second position in which the drive means and the first fluid pump/motor are allowed to rotate with the condition that the second fluid pump/motor is held in its stopped state, and a second control valve connected to the first control valve through the fluid paths and having a first position in which the second fluid pump/motor is rotated in the same direction, a second position in which the first fluid pump/motor and the second fluid pump/motor are both stopped and a third position in which the second fluid pump/motor is rotated in the opposite direction.

In accordance with the present invention, the speed control means is constructed such that it rotates the screw nut member in the same direction as that of the feed member and in the direction opposite to the rotation of the feed member so that a speed of the linear motion is variably controlled. Therefore, the motion converting mechanism according to the present invention is capable of coping with a large number of output modes, and becomes structurally simpler.

BRIEF DESCRIPTION OF THE DRAWINGS

The above and other objects and advantages will become apparent from the following detailed description when read in conjunction with the accompanying drawings wherein.

DESCRIPTION OF THE PREFERRED EMBODIMENTS

Figure 1:
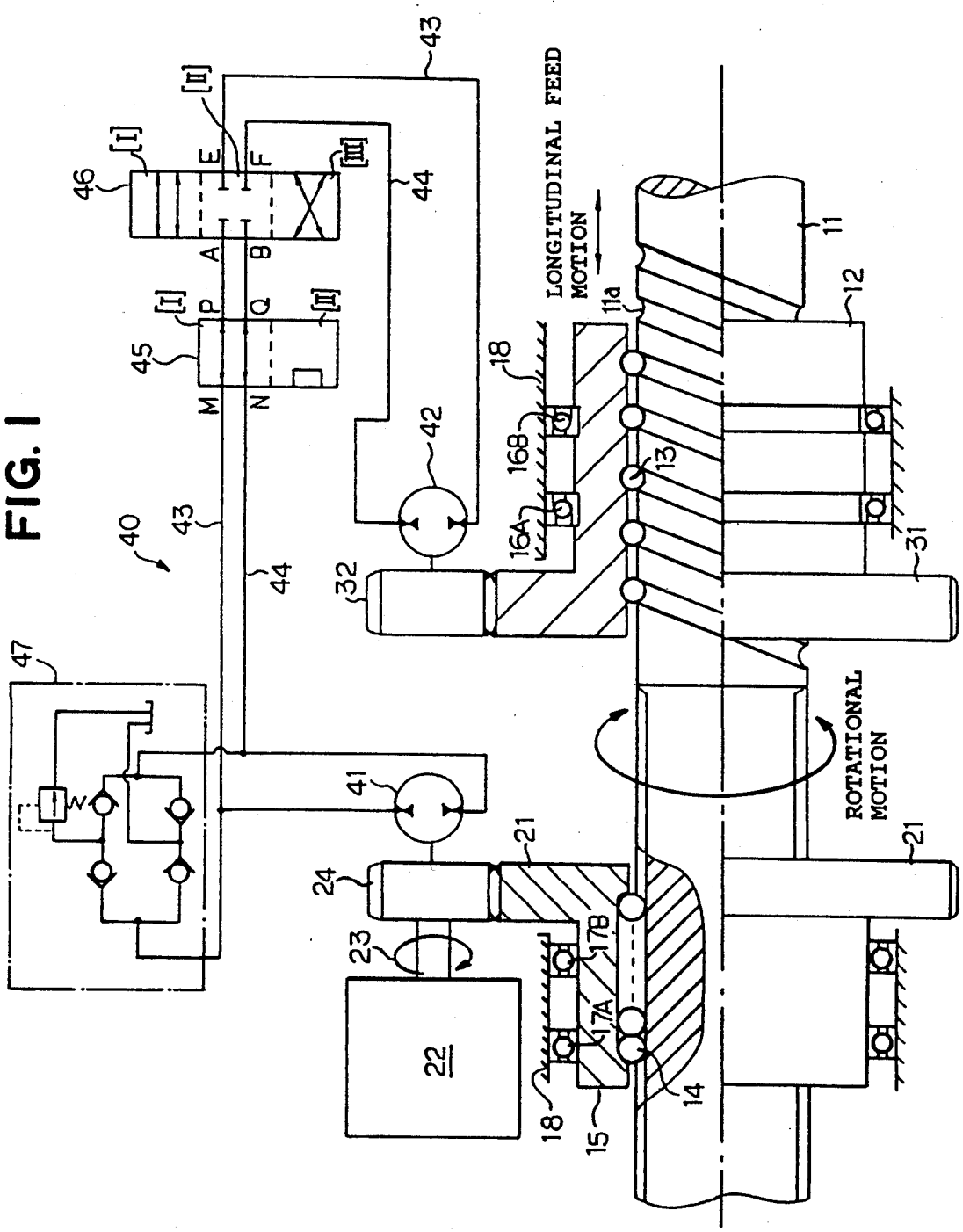
FIG. 1 is a schematic view showing an embodiment of the motion converting mechanism according to the present invention.

Referring to FIG. 1, there is shown a preferred embodiment of a motion converting mechanism in accordance with the present invention.

In FIG. 1, reference numeral 11 denotes a feed bar member 11 provided with a screwed portion 11a and reference numeral 12 denotes a screw nut member. The feed bar member 11 is, for example, connected with the drill of a cutting machine (not shown) and performs the rotation and feed actuation of this drill. The screwed portion 11a of the feed bar member 11 engages with the screw nut member 12 through a plurality of balls 13, and the feed bar member 11 is further ball-spline coupled with an annular member 15 through a plurality of balls 14. The screw nut member 12 and the annular member 15 are freely rotatably supported on a support structure 18 through a pair of bearings 16A and 16B and a pair of bearings 17A and 17B, respectively. Consequently, the feed bar member 11 is also freely rotatably supported on the support structure 18.

The annular member 15 is formed with a driven gear portion 21 of the spur gear type meshing with a drive gear 24 fixedly mounted on the output shaft 23 of an electric motor 22. The electric motor 22 is supported on the support structure 18, and is turned on and off by means of a control circuit (not shown), so that the feed bar member 11 is rotated and stopped through the gear 24 and the annular member 15. The screw nut member 12 is also rotated and stopped by the same motor 22, because the screw nut member 12 is engaged by the feed bar member 11 and freely rotatably supported on the support member 18. The screw nut member 12 is likewise formed with a driven gear portion 31 of the spur gear type meshing with a drive gear 32.

Between the feed-member drive gear 24 and the screw-nut drive gear 32 there is provided speed control means generally designated by reference numeral 40. The speed control means 40 is constructed such that it rotates the screw nut member 12 in opposite directions through the drive gear 32 so that the feed speed (speed of longitudinal feed motion) of the feed bar member 11 can be variably controlled. More particularly, the speed control means 40 comprises a first fluid pump/motor 41 coacting with the electric motor 22 through the gear 24 and having a predetermined capacity (flow rate per one revolution of input shaft), and a second fluid pump/motor 42 coacting with the screw nut member 12 through the gear 32 and having the same capacity as that of the first fluid pump/motor 41. The first fluid pump/motor 41 is held in fluid communication with the second fluid pump/motor 42 through pipe lines 43 and 44. On the pipe lines 43 and 44 there are provided a first 4-port and 2-position changeover valve 45 and a second 4-port and 3-position changeover valve 46. Note that each of the first fluid pump/motor 41 and the second fluid pump/motor 42 comprises, for example, a gear pump/motor.

The 4-port and 2-position changeover valve 45 is a first control valve which connects and disconnects the first fluid pump/motor 41 and the second fluid pump/motor 42. If the first control valve 45 is in its first position I, the valve ports M and N will be connected to the valve ports P and Q, respectively, and the first fluid pump/motor 41 and the second fluid pump/motor 42 will be connected with each other. If, on the other hand, the first control valve 45 is in its second position II, the valve ports M and N will be connected together, and the first fluid pump/motor 41 and the second fluid pump/motor 42 will be disconnected from each other. When the first control valve 45 is changed over from the first position I to the second position II, the electric motor 22 and the first fluid pump/motor 41 are allowed to rotate with the condition that the second fluid pump/motor 42 (and the screw nut member 12) is held in its stopped state.

The 4-port and 3-position changeover valve 46 is a second control valve which connects and disconnects the first fluid pump/motor 41 and the second fluid pump/motor 42. If the second control valve 46 is in its first position I, the valve ports A and B will be connected to the valve ports E and F, respectively, and the first fluid pump/motor 41 and the second fluid pump/motor 42 will be connected with each other. If the second control valve 46 is in its second position II, the valve ports A and B will be disconnected from the valve ports E and F, respectively, and the first fluid pump/motor 41 and the second fluid pump/motor 42 will be disconnected from each other. If the second control valve 46 is in its third position III, the valve ports A and B will be connected to the valve ports F and E, respectively, and the first fluid pump/motor 41 and the second fluid pump/motor 42 will be connected with each other. When the first control valve 45 is in its first position I and the second control valve 46 is in its first position I, the second fluid pump/motor 42 is rotated in one direction. When, on the other hand, the first control valve 45 is in its first position I and the second control valve 46 is in its third position III, the second fluid pump/motor 42 is rotated in the opposite direction. Furthermore, when, the first control valve 45 is in its first position I and the second control valve 46 is in its second position II, the first fluid pump/motor 41 and the second fluid pump/motor 42 are both stopped. In this way, the first and second control valve 44 and 45 controls the fluid that flows between the first fluid pump/motor 41 coacting with the electric motor 22 and the second fluid pump/motor 42 coacting with the screw nut member 12. By the fluid control, the screw nut member is rotated in the same direction as the feed bar member 11 or in the opposite direction, so that the feed speed of the feed bar member 11 is variably controlled.

In a case where axial piston/motors subject to fluid leak are used as the fluid pump/motors 41 and 42 or case of necessity from the standpoint of safety, it is preferable that between the pipe lines 43 and 44 there is provided a fluid supplement/safety circuit communicating with the inlet ports and outlet ports of the fluid pump/motors 41 and 42, that fluid excess and deficiency by a difference in discharged amount between the fluid pump/motors 41 and 42 is eliminated by means of the check valves of the circuit 47, and that the upper limits of pressures in the pipe lines 43 and 44 are set by the relief valve of the circuit 47. In addition, although it is not illustrated that the electric motor 22 is servo controlled, a rotational position detector is attached to the electric motor 22, and a controller for detecting the output of the rotational position detector outputs a control signal proportional to the detected output to a motor driver by which the electric motor 22 is servo controlled. In addition, while it has been described and illustrated that the motor 22 is connected to the gear 24, it is noted that it may also be connected to the gear 32. Furthermore, for example, the motor 22 may also be connected to the axial inner end (left side of FIG. 1) of the feed member 11. In the case of the motor 22 connected to the axial inner end of the feed member 11, the motor 22 is fixed and the screw nut member 12 and the support structure 18 having the screw number member 12 supported thereon are both axially movable in a known manner.

The operation of the embodiment of FIG. 1 will hereinafter be described in detail.

When the 4-port and 2-position changeover valve 45 is in the cutoff position II, the ports P and Q are closed and the rotation of the second fluid pump/motor 42 is stopped, and, on the other hand, the gear 24 and the first fluid pump/motor 41 are rotated by rotation of the electric motor 22. At this time, the first fluid pump/motor 41 becomes substantially no load since the inlet port and outlet port pressures thereof are substantially the same. Therefore, a torque produced by the electric motor 22 is transmitted through the gear 24 to the annular member 15, so that the feed bar member 11 is longitudinally fed at a speed corresponding to the rotational speed of the electric motor 22 while the member 11 is rotating with respect to the screw nut member 12 that has been locked by the second fluid pump/motor 42.

When, on the other hand, the 4-port and 2-position changeover valve 45 is in the connection position I, the ports P and Q are connected to the ports A and B of the 4-port and 3-position changeover valve 46, respectively, and the fluid path between the first fluid pump/motor 41 and the second fluid pump/motor 42 is changed over according to the changeover positions of the 3-position changeover valve 46.

If it is now assumed that the 4-port and 3-position changeover valve 46 is changed over to its first or connection position I, the first fluid pump/motor 41 and the second fluid pump/motor 42 will be rotated in the same directions by rotation of the electric motor 22, and the screw nut member 12 will be rotated together with the feed bar member 11, but a difference of rotation between the annular member 15 and the screw nut member 12 will be caused by various resistances. Therefore, the second fluid pump/motor 42 on the side of the screw nut member 12 acts as a pump and the first fluid pump/motor 41 on the side of the feed bar member 11 acts as a motor. Therefore, the feed bar member 11 is longitudinally fed at very small speeds and also the torque from the electric motor 22 and the torque from the first fluid pump/motor 41 are summed up at the gear 24. Consequently, a rotational torque of the feed bar member 11 is increased.

If the 4-port and 3-position changeover valve 46 is changed over to its second or neutral position II, the first fluid pump/motor 41 and the second fluid pump/motor 42 will be stopped and locked in the stopped positions.

If the 4-port and 3-position changeover valve 46 is changed over to its third or connection position III, the first fluid pump/motor 41 acts as a motor and the second fluid pump/motor 42 acts as a pump, and the first fluid pump/motor 41 is rotated in one direction and the second fluid pump/motor 42 is rotated in the opposite direction. As a consequence, the feed bar member 11 is fed at high speeds because the screw nut member 12 rotates in the direction opposite to the feed bar member 11.

If, in the embodiment of FIG. 1, at least one of the first fluid pump/motor 41 and the second fluid pump/motor 42 is of the variable capacity type and there is a difference in capacity between them, the feed speeds of the feed bar member 11 described above can be adjusted.

In the embodiment of FIG. 1, by the speed control means 40 that is structurally simple, the feed bar member 11 is rotated in the same direction as that of the screw nut member 12 and in the opposite direction so that the rotational amount of the feed bar member 11 relative to the screw nut member 12 is increased and decreased. Therefore, the speed of the longitudinal feed motion of the feed bar member 11 can be variably controlled. In addition, the feed bar member 11 can be fed at low, intermediate and high speeds and locked in various positions by changing over the fluid path between the first fluid pump/motor 41 and the second fluid pump/motor 42. Furthermore, the motion converting mechanism constructed according to the present invention can be made small.

Figure 2:
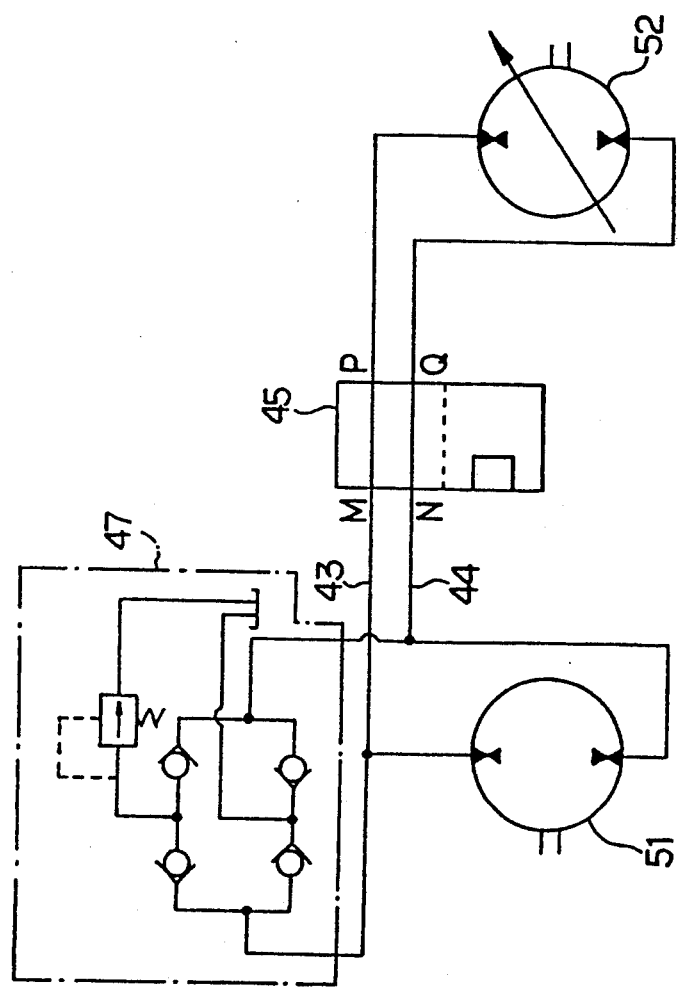
FIG. 2 is a schematic view showing another embodiment of the motion converting mechanism according to the present invention.

FIG. 2 schematically illustrates another embodiment of the motion converting mechanism according to the present invention. The same reference numerals will be applied to the parts substantially identical to corresponding parts of the FIG. 1 embodiment and therefore a description of the corresponding parts will not be given.

In the embodiment of FIG. 2, either one of a first fluid pump/motor 51 and a second fluid pump/motor 52 may be of the variable capacity type, such as a piston pump of the slanted plate type and a variable capacity vane pump of the eccentric type. For example, the second fluid pump/motor 52 is of the variable capacity type, as shown. By increasing and decreasing the capacity of the second fluid pump/motor 52, the amounts of flow of the pump/motor 51 and the pump/motor 52 can be relatively changed. This relative change causes the rotational speed of the screw nut member 12 to change and the relative rotational direction between the feed bar member 11 and the screw nut member 12 to change. Therefore, in FIG. 2 embodiment, the feed speed of the feed bar member 11 can also be variably controlled by rotating the screw nut member 12 in opposite directions, and the same effect as that of the FIG. 1 embodiment can be obtained. Furthermore, since a changeover valve (corresponding to the 4-port and 3-position changeover valve 46 of FIG. 1) for changing over the direction of connection between the first fluid pump/motor 51 and the second fluid pump/motor 52 is not needed, the motion converting apparatus can be made more smaller and more structurally simpler.

While in the embodiments of the present invention it has been described that the feed bar member 11 is connected with the drill of a cutting machine, it is noted that the present invention is also applicable to various kinds of members that require a rotational motion and a linear motion, such as the screw rod of an injection-molding machine, etc.

What I claim is:

1. A motion converting mechanism comprising:
   a feed member provided with a screwed portion;
   a screw nut member engaging with said screwed portion of said feed member;
   a support member rotatably supporting said feed member and said screw nut member;
   drive means for imparting a rotational motion to said feed member in a direction of rotation, the rotational motion of said feed member being converted into a linear motion through said screw nut member; and
   speed control means provided between said drive means and said screw nut member and constructed such that it rotates said screw nut member in the same direction as that of said feed member and in a direction opposite to the direction of rotation of said feed member so that a speed of said linear motion is invariably controlled;
   said speed control means comprising a first fluid pump/motor coacting with said drive means, a second fluid pump/motor coacting said screw nut member and held in fluid communication with said first fluid pump/motor through fluid paths, a first control valve provided on said fluid paths having a first position in which said first fluid pump/motor and said second fluid pump/motor are connected with each other and a second position in which said drive means and said first fluid pump/motor are allowed to rotate with a condition that said second fluid pump/motor is held in a stopped state, and a second control valve connected to said first control valve through said fluid paths and having a first position in which said second fluid pump/motor is rotated in said same direction, a second position in which said first fluid pump/motor and said second fluid pump/motor are both stopped and a third position in which said second fluid pump/motor is rotated in the opposite direction.

2. A motion converting mechanism as set forth in claim 1 wherein said first fluid pump/motor has a predetermined capacity and said second fluid pump/motor has the same capacity as that of said first fluid pump/motor.

3. A motion converting mechanism as set forth in claim 1, wherein said first fluid pump/motor has a first predetermined capacity and said second fluid pump/motor has a second predetermined capacity different from said first predetermined capacity, and at least one of said first fluid pump/motor and said second fluid pump/motor is of a variable capacity type.

4. A motion converting mechanism as set forth in claim 1, which further comprises a fluid supplement/safety circuit provided on said fluid paths and having check valves for eliminating fluid excess and deficiency caused by a difference in discharged amount between said first fluid pump/motor and said second fluid pump/motor and a relief valve for setting upper limits of pressures in said fluid paths.

5. A motion converting mechanism as set forth in claim 1, wherein said feed member is connected to a screw rod of an injection-molding machine.

6. A motion converting mechanism as set forth in claim 1, wherein said first fluid pump/motor comprises a gear pump/motor and said second fluid pump/motor comprises a gear pump/motor.

7. A motor converting mechanism comprising:
a feed member provided with a screwed portion;
a screw nut member engaging with said screwed portion of said feed member;
a support member rotatably supporting said feed member and said screw nut member;
drive means for imparting a rotational motion to said feed member in a direction of rotation, the rotational motion of said feed member being converted into a linear motion through said screw nut member; and
speed control means provided between said drive means and said screw nut member and constructed such that it rotates said screw nut member in the same direction as that of said feed member and in a direction opposite to the direction of rotation of said feed member so that a speed of said linear motion is variably controlled;
said speed control means comprising a first fluid pump/motor coacting with said drive means, a second fluid pump/motor coacting with said screw nut member and held in fluid communication with said first fluid pump/motor through fluid paths, a control valve provided on said fluid paths having a first position in which said first fluid pump/motor and said second fluid pump/motor are connected with each other and a second position in which said drive means and said first fluid pump/motor are allowed to rotate with a condition that said second fluid pump/motor is held in a stopped state, said second fluid pump/motor being of a variable capacity pump type, and said screw nut member being rotated in said same direction and in the opposite direction by increasing and decreasing the capacity of said second fluid pump/motor.

8. A motion converting mechanism as set forth in claim 7, which further comprises a fluid supplement/safety circuit provided on said fluid paths and having check valves for eliminating fluid excess and deficiency caused by a difference in discharged amount between said first fluid pump/motor and said second fluid pump/motor and a relief valve for setting upper limits of pressures in said fluid paths.

9. A motion converting mechanism as set forth in claim 7, wherein said first fluid pump/motor comprises a gear pump/motor and said second fluid pump/motor comprises a eccentric-type variable capacity vane pump.

10. A motion converting mechanism comprising:
a feed member provided with a screw portion;
a screw nut member engaging with said screwed portion of said feed member;
a support member rotatably supporting said feed member and said screw nut member;
drive means provided in such a manner that a relative rotational motion between said feed member and said screw nut member is converted into a linear motion; and
speed control means connected at one end thereof to said feed member and at another end thereof to said screw nut member and constructed such that a speed of said linear motion is variably controlled by changing a relative speed of said relative rotational motion;
said speed control means comprising a first fluid pump/motor coacting with said drive means, a second fluid pump/motor coacting with said screw nut member and held in fluid communication with said first fluid pump/motor through fluid paths, a first control valve provided on said fluid paths having a first position in which said first fluid pump/motor and said second fluid pump/motor are connected with each other and a second position in which said drive means and said first fluid pump/motor are allowed to rotate with a condition that said second fluid pump/motor is held in a stopped state, and a second control valve connected to said first control valve through said fluid paths and having a first position in which said second fluid pump/motor is rotated in one direction of rotation, a second position in which said first fluid pump/motor and said second fluid pump/motor are both stopped and a third position in which said second fluid pump/motor is rotated in a direction opposite to said one direction.

11. A motion converting mechanism comprising:
a feed member provided with a screwed portion;
a screw nut member engaging with said screwed portion of said feed member;
a support member rotatably supporting said feed member and said screw nut member;
drive means provided in such a manner that a relative rotational motion between said feed member and said screw nut member is converted into a linear motion; and
speed control means connected at one end thereof to said feed member and at another end thereof to said screw nut member and constructed such that a speed of said linear motion is variably controlled by changing a relative speed of said relative rotational motion;
said speed control means comprising a first fluid pump/motor coacting with said drive means, a second fluid pump/motor coacting with said screw nut member and held in fluid communication with said first fluid pump/motor through fluid paths, a control valve provided on said fluid paths having a first position in which said first fluid pump/motor and said second fluid pump/motor are connected with each other and a second position in which said drive means and said first fluid pump/motor are allowed to rotate with a condition that said second fluid pump/motor is held in a stopped state, said second fluid pump/motor being of a variable capacity pump type, and said screw nut member being rotated in said one direction and in a direction opposite to said one direction by increasing and decreasing the capacity of said second fluid pump/motor.

* * * * *